(12) United States Patent     (10) Patent No.: US 12,643,318 B2
Song et al.     (45) Date of Patent: Jun. 2, 2026

(54) METHOD AND APPARATUS FOR MANUFACTURING LAMINATE FILM FOR CELL-TYPE BATTERY POUCH

(71) Applicant: Youlchon Chemical Co., Ltd., Seoul (KR)

(72) Inventors: Nok Jung Song, Seoul (KR); Hee Sik Han, Gyeonggi-do (KR); Jin Ho Kim, Gyeonggi-do (KR); Ji Min Lee, Gyeonggi-do (KR); Han Chul Park, Gyeonggi-do (KR); Jong Hyuk Jung, Gyeonggi-do (KR); Hyeong Rok Choi, Gyeonggi-do (KR)

(73) Assignee: Youlchon Chemical Co., Ltd., Seoul (KR)

( * ) Notice: Subject to any disclaimer, the term of this patent is extended or adjusted under 35 U.S.C. 154(b) by 513 days.

(21) Appl. No.: 18/162,961

(22) Filed: Feb. 1, 2023

(65) Prior Publication Data

US 2024/0253342 A1    Aug. 1, 2024

(51) Int. Cl.
| | |
|---|---|
| *H01M 4/00* | (2006.01) |
| *B32B 37/00* | (2006.01) |
| *B32B 37/06* | (2006.01) |
| *B32B 37/08* | (2006.01) |
| *B32B 37/12* | (2006.01) |
| *B32B 38/00* | (2006.01) |

(Continued)

(52) U.S. Cl.
CPC ...... *B32B 37/1284* (2013.01); *B32B 37/0053* (2013.01); *B32B 37/06* (2013.01); *B32B 37/08* (2013.01); *B32B 38/164* (2013.01); *B32B*

*39/00* (2013.01); *B32B 2037/1253* (2013.01); *B32B 2457/10* (2013.01); *H01M 50/105* (2021.01)

(58) Field of Classification Search
CPC . B32B 37/1284; B32B 37/0053; B32B 37/06; B32B 37/08; B32B 38/164; B32B 39/00; B32B 2037/1253; B32B 2457/10; H01M 50/105
See application file for complete search history.

(56) References Cited

U.S. PATENT DOCUMENTS

2012/0273128 A1* 11/2012 Hata .................... B32B 37/003
 156/308.2
2020/0113048 A1* 4/2020 Kasai .................. B32B 37/203

FOREIGN PATENT DOCUMENTS

CN 209593800 U 11/2019
CN 111438929 A 7/2020
JP H 04201237 A 7/1992

(Continued)

*Primary Examiner* — Nicholas P D'Aniello
(74) *Attorney, Agent, or Firm* — Morgan, Lewis & Bockius LLP

(57) ABSTRACT

Proposed are a method and apparatus for manufacturing a laminate film for a cell-type battery pouch. More specifically, the present disclosure relates to a technology of manufacturing a pouch film used to manufacture a pouch-type battery. Specifically, when manufacturing a laminate film for a pouch using a dry lamination process, induction heating rolls that are controllable in heat generation thereof are used to perform a post thermal treatment process after performing a lamination process using thermal rolls. The method and apparatus can reduce an aging period that is required to improve the physical properties of a manufactured pouch or can improve the physical properties of a manufactured pouch without an aging process.

6 Claims, 10 Drawing Sheets

(51) Int. Cl.
   *B32B 39/00* (2006.01)
   *H01M 50/105* (2021.01)

(56) References Cited

FOREIGN PATENT DOCUMENTS

| JP | H 08300549 | A | 11/1996 |
| JP | 2005026152 | A | 1/2005 |
| JP | 2010015695 | A | 1/2010 |
| JP | 2014199761 | A | 10/2014 |
| JP | 2017107861 | A | 6/2017 |
| JP | 2017204362 | A | 11/2017 |
| KR | 20190112520 | A | 10/2019 |
| KR | 102142600 | B1 | 8/2020 |
| KR | 20200138899 | A | 12/2020 |
| WO | WO 2019008876 | A1 | 1/2019 |

* cited by examiner

S100

FORM ADHESIVE LAYER BY APPLYING ADHESIVE
ON ONE SURFACE OF BASE SHEET

S200

DRY AND CURE ADHESIVE LAYER

S300

HOT PRESS MATERIAL SHEET AGAINST ONE SIDE
(ADHESIVE LAYER) OF BASE SHEET TO FORM
AMINATE FILM

S400

THERMALLY THREAT LAMINATE FILM
IN PRESSURELESS STATE

S500

COOL THERMALLY-TREATED LAMINATE FILM

FIG. 10

|  | NO AIGING HEAT BONDING STRENGTH | 1 DAY OF AGING HEAT BONDING STRENGTH |
|---|---|---|
| COMPARATIVE EXAMPLE – CONVENTIONAL ART (CONVENTIONAL HEAT TREATMENT) | 0N/15mm | 30N/15mm |
| EXAMPLE (HEAT TREATMENT USING INDUCTION HEATING ROLL) | 70N/15mm | 80N/15mm |

METHOD AND APPARATUS FOR MANUFACTURING LAMINATE FILM FOR CELL-TYPE BATTERY POUCH

BACKGROUND OF THE DISCLOSURE

1. Field of the Disclosure

The present disclosure relates to a method and apparatus for manufacturing a laminate film for a cell-type battery pouch. More particularly, the present disclosure relates to a technique of manufacturing a pouch film used to manufacture a pouch-type battery cell.

In particular, the present disclosure relates to a method and apparatus for manufacturing a laminate film for a cell-type battery pouch in solvent dry lamination (SDL) equipment, in which the method and apparatus can improve the physical properties of the manufactured laminate film while shortening an aging period or without performing an aging process. The advantages can be achieved by performing thermal treatment after lamination by using a thermally controllable induction heating roll.

2. Description of the Related Art

In recent years, efforts have been made to reduce the use of fossil fuels due to a variety of problems such as environmental pollution. Particularly, in the case of automobiles, electric vehicles that do not use fossil fuels such as refined petroleum but that use green energy are being developed. In addition, a variety of electric products have been developed to replace their conventional fuel-driven counterparts.

These electric products are usually equipped with a secondary battery that can be repeatedly charged and discharged. Particularly, secondary batteries for use in electric vehicles can be classified into pouch type, cylindrical, and angular type according to the external shape thereof.

Among these secondary batteries, the pouch type has many advantages due to its structure in which an electrode assembly is encased by a pouch-shaped case made of a metal laminate sheet. Specifically, the pouch type is easy to manufacture, incurs low manufacturing costs, and is easy to construct into a large capacity battery pack by connecting multiple cells in series or in parallel. For these advantages, the pouch type is frequently used in applications requiring a large battery capacity, such as electric vehicles.

In solvent drying lamination (SDL) equipment for manufacturing a pouch film used in a pouch-shaped battery cell, different materials of sheets are hot pressed by heating rolls (also referred to as thermal rolls) to form a laminate film.

Regarding this technology, one specific example is disclosed in Korean Patent No. 10-2142600, entitled "Battery Cell Pouch Film and Manufacturing Method Thereof" (hereinafter, referred to as "related art"). According to the related art, dry lamination is primarily performed at a relatively low temperature, and thermal lamination using thermal rolls is secondarily performed at a relatively high temperature, followed by cooling. Through these lamination steps, different sheets are integrated into a film.

The thermal roll-involved lamination method of the related art has many problems. For example, the heating rolls transfer heat to target sheets by coming into direct contact with the target sheets. Therefore, to obtain a film with good physical properties and thermal bonding strength, the heating rolls need to have an extremely high temperature. In addition, to supply sufficient thermal energy to the target sheets, the lamination needs to be performed at an extremely low operation speed, which results in significant reduction in the production productivity of the laminate films.

On the other hand, the sheets used to form a pouch film have different coefficients of thermal expansion depending on the materials of the sheets. These differences in the coefficient of thermal expansion between the sheets are not problematic in the primary lamination process that is performed at a relatively low temperature.

More specifically, in the case of the related art, since each sheet supplied to drying rolls is not yet bonded together, the speed at which the sheets fed to the drying rolls can be naturally adjusted. Therefore, the sheets made of different materials can be smoothly bonded together by the primary lamination.

However, when the laminate of the sheets produced through the relatively low-temperature primary lamination undergoes the relatively high-temperature secondary lamination, since heat and pressure are applied to the primarily laminated sheets, the sheet having a higher coefficient of thermal expansion is more stretched than the sheet having a lower coefficient of thermal expansion. Therefore, there is a problem that wrinkling, crushing, torsion, deformation, and/or warping occurs in the finally produced laminate film.

Consequently, the manufacturing method of the related art has problems. First, since target sheets to form a laminate need to be fed at an extremely low speed so that sufficient thermal energy can be supplied to the sheets, film production productivity is very low. Second, since two lamination stages are required, the product defect rate is high.

SUMMARY OF THE DISCLOSURE

To solve the problems occurring in the related art, the present disclosure provides a method and apparatus for manufacturing a laminate film for a large capacity pouch-type battery cell using a dry lamination process. According to the present disclosure, induction heating rolls that are controllable in heat generation thereof are used in a lamination process. Therefore, a battery pouch film having good physical properties can be produced through a single lamination stage.

According to the present disclosure, a pressureless thermal treatment process follows the lamination process performed using the induction heating rolls. Therefore, an aging period performed to improve the physical properties of a manufactured film can be remarkably reduced or can be eliminated. In some embodiments, there are provided a method and apparatus for manufacturing a laminate film for a cell-type battery pouch in solvent dry lamination (SDL) equipment.

According to the present disclosure, there are provided a method and apparatus for manufacturing a laminate film for a cell-type battery, the method and apparatus involving a stepwise thermal treatment process in which the temperature of sheets is gradually raised by using an induction heating roll that is controllable in heat generation thereof. With the method and apparatus of the present disclosure, it is possible to prevent a manufactured film from being damaged by rapid temperature change. Specifically, it is possible to prevent film defects, wrinkles, and significant deterioration in physical properties of a manufactured film.

In order to accomplish the above objectives, in one aspect of the present disclosure, there is provided a method of manufacturing a laminate film for a cell-type battery pouch, the method including: performing lamination by hot pressing a material sheet against one surface of a base sheet to forma a laminate; and thermally threating the laminate in a pressureless manner.

The method may further include: applying an adhesive to the surface of the base sheet to form an adhesive layer before the hot pressing; and drying the adhesive layer to cure the adhesive layer. The hot pressing is performed to laminate the material sheet on the cured adhesive layer. After the pressureless thermal treatment, the method includes cooling the laminate.

In the pressureless thermal treatment, at least one induction heating roll is used to supply thermal energy to the laminate according to a feed speed of the laminate.

In the pressureless thermal treatment, the number of induction heating rolls used may vary depending on the feed speed of the laminate.

In the pressureless thermal treatment, a contact area between the induction heating roll and the laminate may be controlled to adjust the amount of the thermal energy supplied to the laminate.

The pressureless thermal treatment may involve: a temperature elevation stage of gradually increasing the amount of thermal energy supplied to the laminate until a thermal treatment target temperature is reached; and a temperature drop stage of gradually reducing the thermal energy supplied to the laminate when the temperature of the laminate reaches the thermal treatment target temperature so that the temperature of the laminate decreases from the thermal treatment target temperature.

In the pressureless thermal treatment, a plurality of induction heating rolls may be used to supply thermal energy to the laminate, the temperature of the induction heating rolls used in the temperature elevation stage may be gradually increased, and the temperature of the induction heating rolls disposed in the temperature drop stage may be gradually decreased.

In the pressureless thermal treatment, the position of the induction heating roll may be controlled to adjust a feed path of the laminate, a contact area between the laminate and the induction heating roll, or both.

In another aspect of the present disclosure, there is provided an apparatus for manufacturing a laminate film for a cell-type battery pouch, the apparatus including: a laminating module including at least one pair of thermal rolls for bonding a base sheet and a material sheet to each other to form a laminate by hot pressing; and a pressureless thermal treatment module including at least one induction heating roll that comes into surface contact with the laminate to thermally treat the laminate in a pressureless manner when the laminate produced by bonding in the laminating module is introduced.

The pressureless thermal treatment module may further include a heating controller configured to control an on/off operation and a temperature of the induction heating roll according to at least one factor selected from among a feed speed of the laminate, the number and arrangement of the induction heating rolls provided in the pressureless thermal treatment module, and a contact area with the laminate.

The pressureless thermal treatment module may be configured such that a plurality of induction heating rolls is arranged to be in contact with the laminate, and the heating controller may divide the plurality of induction heating rolls into at least two groups and control the temperature of the induction heating rolls group by group.

In addition, the heating controller may control the induction heating rolls such that some of the induction heating rolls disposed near an inlet side through which the laminate is introduced sequentially show an increase in temperature, from the heating roll closest to the inlet side, and some induction heating rolls disposed near an outlet side through which the laminate is discharged sequentially show a decrease in temperature toward the induction heating roll closest to the outlet side.

The pressureless thermal treatment module may further include: at least one stationary induction heating roll fixed at a position; and at least one movable induction heating roll configured to perform reciprocating motion. The heating controller may control the position of the movable induction heating roll to adjust a feed distance of the laminate, the number of induction heating rolls coming into contact with the laminate, or both.

According to the present disclosure, when manufacturing a pouch film for a large capacity pouch-type battery cell using a dry lamination process, since induction heating rollers that can be controlled in heating operation thereof are used, it is possible to manufacture a pouch film having the desired physical properties through only one lamination process.

Specifically, according to the present disclosure, since pressureless thermal treatment follows the lamination process performed with the use of the induction heating rolls in solvent dry lamination (SDL) equipment, it is possible to remarkably reduce an aging period for a manufactured pouch. In some cases, it is possible to improve the physical properties of the manufactured laminate film without an aging period.

According to the present disclosure, in a thermal treatment process performed to reduce the aging period, since a stepwise thermal treatment method is used in which the temperature of sheets is gradually raised by using an induction heating roll, it is possible to prevent a manufactured film from being damaged by rapid temperature change. Specifically, it is possible to prevent film defects, wrinkles, and significant deterioration in physical properties of the manufactured film.

As described above, according to the present disclosure, the aging period can be remarkably reduced or can be eliminated. Therefore, it is possible to remarkably increase the production productivity of pouch films and significantly lower the manufacturing cost for pouch films. As a result, pouch films with price competitiveness can be produced.

In addition, according to the present disclosure, the present disclosure has an advantage of providing an optimal environment for manufacturing a film for a pouch by controlling the supply of thermal energy according to the feed speed of the laminate to be heat treated.

In addition, according to the present disclosure, the supply of thermal energy can be controlled by various methods such as adjustment of the number of induction heating rolls, adjustment of the contact area between the induction heating rolls and the laminate, and adjustment of the feed distance of the laminate during the thermal treatment.

Therefore, it is possible to improve reliability and competitiveness of films in applications such as large capacity secondary batteries, specifically pouch-type battery cells, and other applications.

BRIEF DESCRIPTION OF THE DRAWINGS

FIG. 10 is a table showing comparison of physical properties between a laminate film produced by the method of FIG. 1 and a conventional laminate film.

DESCRIPTION OF THE PREFERRED EMBODIMENTS

A method and apparatus for manufacturing a laminate film for a cell type battery pouch according to the present disclosure may be diversely embodied. Hereinafter, preferred embodiments will be described with reference to the accompanying drawings.

Figure 1:
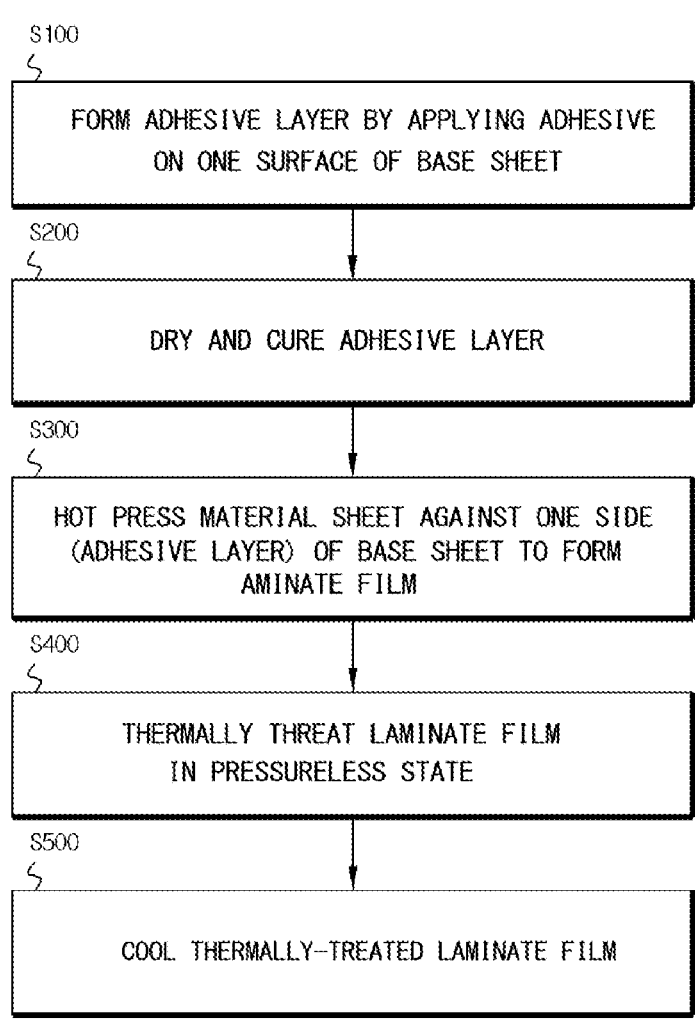
FIG. 1 is a flowchart illustrating an exemplary method of manufacturing a laminate film for a cell-type battery pouch according to one embodiment of the present disclosure.

FIG. 1 is a flowchart illustrating an exemplary method of manufacturing a laminate film for a cell-type battery pouch according to one embodiment of the present disclosure;

Referring to FIG. 1, a method of manufacturing a laminate film for a cell-type battery pouch includes an adhesive layer formation step S100, an adhesive layer drying step S200, a hot pressing lamination step S300, a pressureless thermal treatment step S400, and a laminate film cooling step S500.

The adhesive layer formation step S100 is a process of applying adhesive on one surface of a base sheet. When a roll-shaped base sheet is supplied, a liquid adhesive is sprayed onto one surface of the base sheet to form an adhesive layer. Here, the base sheet may be a metal sheet constituting a pouch of a pouch-type battery cell, and the metal sheet may be made of aluminum.

The adhesive layer drying step S200 is a process of curing the adhesive layer applied on the base sheet. The drying may be performed by heat drying or hot-air drying. In this case, the adhesive layer may be semi-dried to have a gel form or completely dried through the curing.

The hot pressing lamination step S300 is a process of hot pressing a material sheet against the gel-like or completely cured adhesive layer. In this step, a roll-shaped material sheet is brought into contact with the adhesive layer. Here, the material sheet may be made of casting polypropylene (CPP) or nylon used to form the pouch of the pouch-type battery cell.

In the hot pressing lamination step S300, both of the base sheet and the material sheet are pressed by thermal rolls that release a predetermined amount of heat.

The pressureless thermal treatment step S400 is a process of thermally treating the laminate without applying pressure to the laminate. In this step, a predetermined amount of thermal energy is supplied for a predetermined period of time.

The pressureless thermal treatment step S400 will be described in more detail below.

Finally, the laminate cooling step S500 is a process of cooling the heat-treated laminate using cooling rolls.

Figure 2:
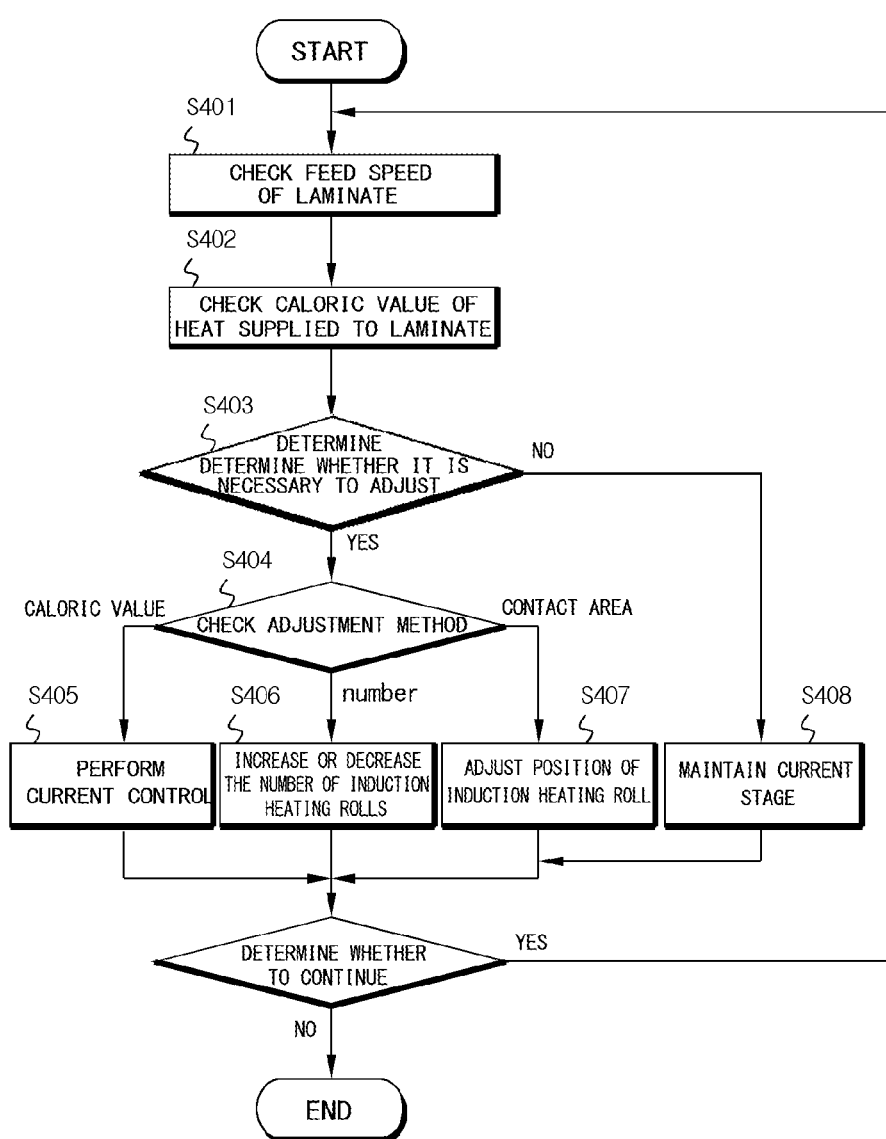
FIG. 2 is a flowchart illustrating a specific example of Step S400 of FIG. 1.

FIG. 2 is a flowchart illustrating a specific embodiment of Step S400 of FIG. 1, and FIGS. 3A, 3B, 3C, 4A, and 4B are diagrams illustrating exemplary embodiments of FIG. 2.

Referring to FIG. 2, in the pressureless thermal treatment step S400, at least one induction heating roll is used to supply an amount of thermal energy that varies depending on the feed speed of the laminate.

Specifically, the feed speed of the laminate that is being transported is first checked in Step S401, and then the calorific value (thermal energy) supplied to the laminate at the feed speed is checked in Step S402. For example, the feed speed of the laminate is determined by measuring the rotational speed of the induction heating roll, the guide roll that guides the laminate along a movement direction, or the thermal roll performing the lamination.

When it is necessary to adjust the amount of thermal energy supplied to the laminate (S403), the amount of thermal energy supplied to the laminate may be checked in Step S404.

For example, when directly controlling the calorific value (amount of thermal energy), the current supplied to the induction heating roll is controlled to adjust the thermal energy supplied to the laminate in Step S405.

Figure 3A:
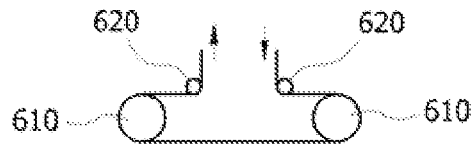
FIGS. 3A, 3B, 3C, 4A, and 4B are diagrams illustrating examples of FIG. 2.
Figure 3B:
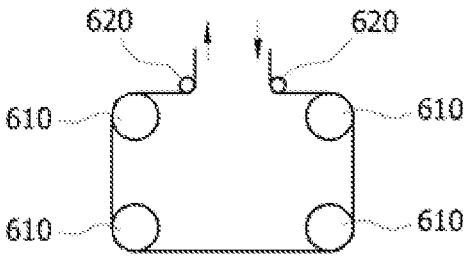
Figure 3C:
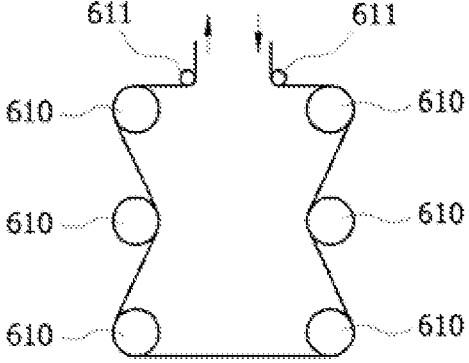

Alternatively, when adjusting the number of the induction heating rolls in Step S404, the number of the induction heating rolls 610 used for the thermal treatment is reduced to be in a range of 2 to 6 in Step S406 as illustrated in FIGS. 3A, 3B, and 3C. In this way, the thermal energy supplied to the laminate can be adjusted in Step S406.

Figure 4A:
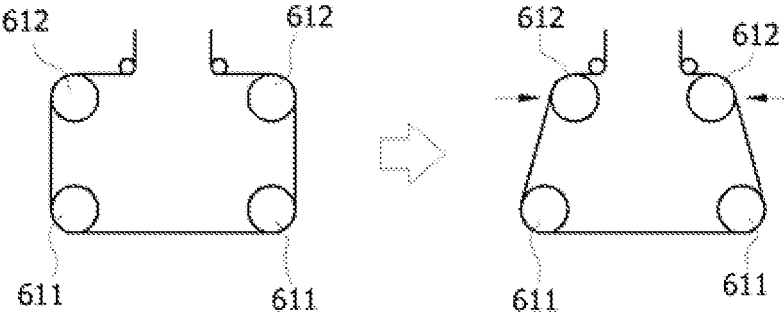
Figure 4B:
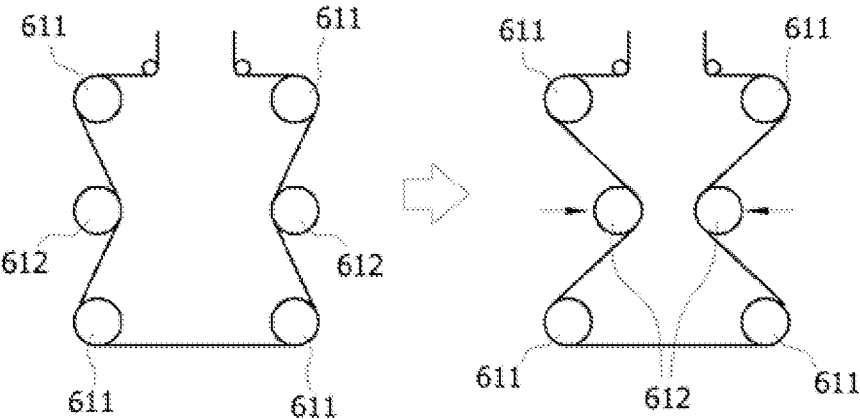

Alternatively, when adjusting the contact area between the induction heating roll 610 and the laminate as in Step S404, as illustrated in FIGS. 4A and 4B, the position of the movable induction heating roll 612 is changed while the position of the stationary induction heating roll 611 is fixed. That is, the contact area between the induction heating roll and the laminate may be controlled to adjust the amount of thermal energy supplied to the laminate (S407).

Specifically, FIG. 4A illustrates a case where the contact area is reduced by the movement of the movable induction heating rolls 612. FIG. 4B illustrates a case where the contact area is increased by the movement of the movable induction heating roll 612. In each of the cases, when the movable induction heating rolls 612 are moved in the opposite direction, the increase or decrease of the contact area is reversed.

When it is not necessary to adjust the amount of thermal energy supplied to the laminate (S403), the state obtained by one of the processes S405 to S407 may be maintained (S408).

Figure 5:
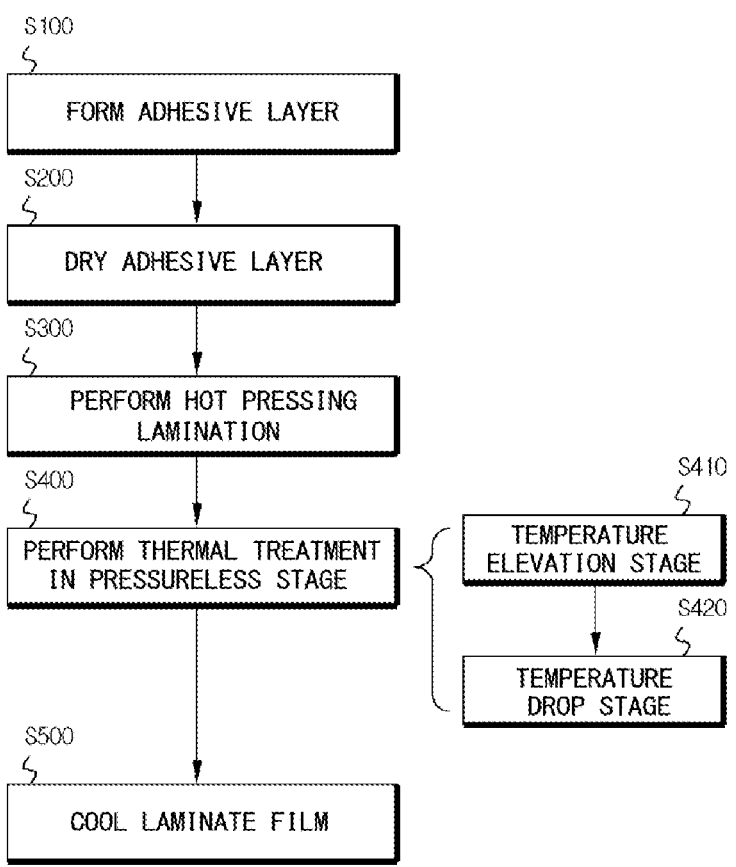
FIG. 5 is a flowchart illustrating another specific example of Step S400 of FIG. 1.
Figure 6A:
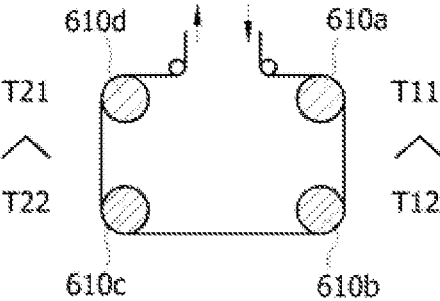
FIGS. 6A and 6B are diagrams illustrating examples of FIG. 5.
Figure 6B:
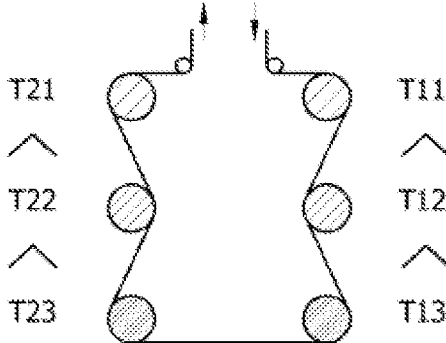

FIG. 5 is a flowchart illustrating a specific embodiment of Step S400 of FIG. 1, and FIGS. 6A and 6B are diagrams illustrating exemplary embodiments of FIG. 5.

Referring to FIG. 5, the pressureless thermal treatment step S400 involves a temperature elevation stage S410 and a temperature drop stage S420.

As described above, when the amount of thermal energy supplied to the laminate is dramatically changed during the process of laminating the base sheet and the material sheet, deformation or the like occurs in the laminate, thereby increasing the defect rate.

Accordingly, the pressureless thermal treatment step S400 according to the present disclosure includes: a temperature elevation stage S410 of gradually increasing the amount of the thermal energy supplied to the laminate until reaching a thermal treatment target temperature; and a temperature drop stage S420 of gradually reducing the amount of thermal energy supplied to the laminate so that the temperature is lowered from the thermal treatment target temperature.

For example, when four induction heating rolls 610a to 610d are used in the thermal treatment process as illustrated in FIG. 6A, the temperatures of second and third induction heating rolls target 610*b* and 610*c* are raised to the thermal treatment temperature (for example, 200° C.), a first induction heating roll 610*a* is set to a first intermediate temperature (for example, 150° C.) between a lamination process temperature (for example, 100° C.) and the thermal treatment target temperature, and a fourth induction heating roll 610*b* is set to a second intermediate temperature (for example, 100° C.) between the thermal treatment target temperature and a cooling roll temperature (for example, 0° C.).

In this way, when thermal energy is supplied to the laminate using a plurality of induction heating rolls as illustrated in FIG. 6B, the temperature of the induction heating rolls used in the temperature elevation stage (three on the left side of FIG. 6B) can be controlled to gradually increase, and the temperature of the induction heating rolls disposed in the temperature drop stage (three on the right side of FIG. 6B) can be controlled to gradually decrease.

In addition, in the pressureless thermal treatment step S400, as described above with reference to FIGS. 4A and 4B, the positions of the induction heating rolls 510 are controlled so that at least one of the contact area between the laminate and the induction heating roll and the feed path of the laminate can be adjusted. Therefore, the temperature of each of the induction heating rolls can be individually controlled.

Hereinafter, an apparatus (equipment) to which the pouch film manufacturing method described above is applicable will be described.

Figure 7:
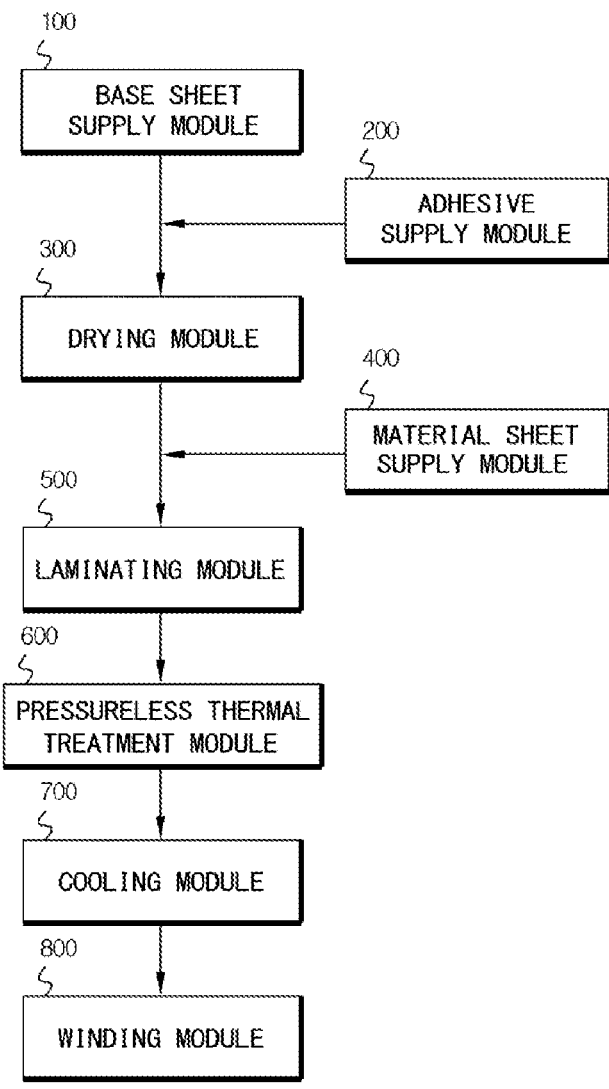
FIG. 7 is a block diagram illustrating an apparatus for manufacturing a laminate film for a cell-type battery pouch according to one embodiment of the present disclosure.
Figure 8:
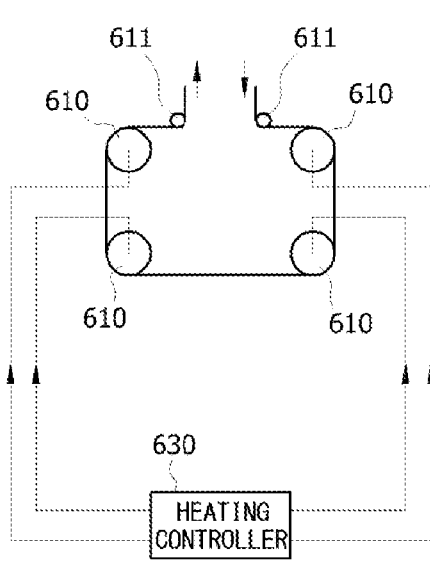
FIGS. 8 and 9 are diagrams illustrating examples of a pressureless thermal treatment module illustrated in FIG. 7.
Figure 9:
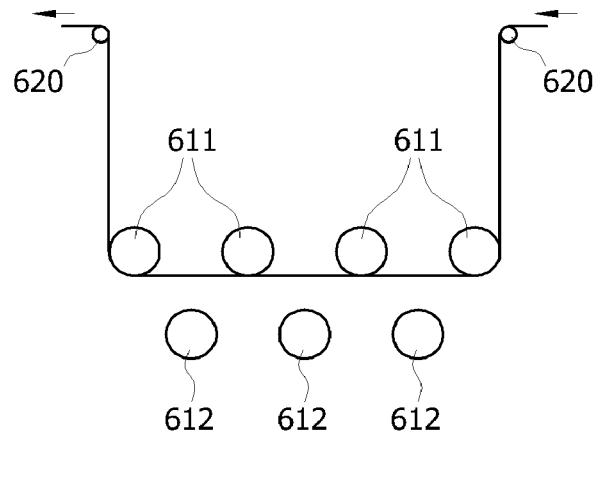
Figure 9:
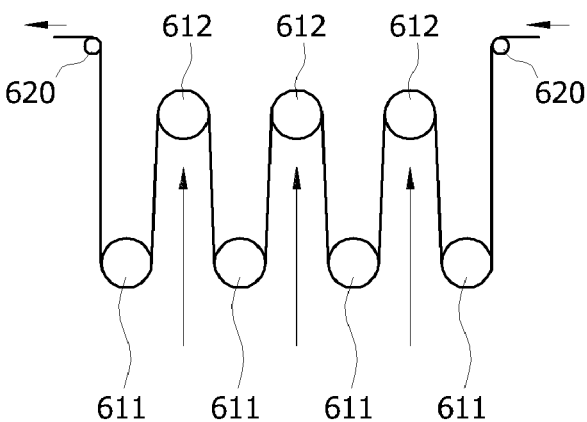

FIG. 7 is a block diagram illustrating an apparatus for manufacturing a laminate film for a cell-type battery pouch according to one embodiment of the present disclosure. FIGS. 8 and 9 are views illustrating examples of a pressureless thermal treatment module illustrated in FIG. 7.

Referring to FIG. 7, the apparatus for manufacturing a laminate film for a cell-type battery pouch includes: a base sheet supply module 100, an adhesive supply module 200, a drying module 300, a material sheet supply module 400, a laminating module 500, a pressureless thermal treatment module 600, a cooling module 700, and a winding module 800.

The base sheet supply module 100 supplies a base sheet made of a metal such as aluminum. The base sheet supply module 100 includes a supply roll in which the base sheet is wound, a drive unit for rotating the base sheet roll, and multiple guide rolls for guiding the base sheet.

The adhesive supply module 200 sprays a liquid adhesive on one surface of the base sheet. The adhesive supply module 200 includes a storage tank for storing the liquid adhesive, a supply pipe for supplying the liquid adhesive, and a spray nozzle provided at an end of the supply pipe to spray the liquid adhesive.

The drying module 300 dries the base sheet on which the adhesive is applied, by heat drying or hot-air drying. The drying module 300 includes a transfer roller to which the base sheet is transferred, an oven-type housing configured to supply heat or hot air to the base sheet, a heating unit that generates heat, and a hot air fan that supplies hot air to the base sheet.

The material sheet supply module 400 supplies a material sheet made of CPP or the like to the adhesive layer applied on the base sheet. Like the base sheet supply module 100 described above, the material sheet supply module 400 includes a supply roll in which the material sheet is wound, a drive unit for rotating the supply roll, and multiple guide rolls for guiding the supply rolls of the material sheet.

The laminating module 500 applies heat and pressure to the base sheet and the material sheet so that the base sheet and the material sheet are bonded to form a laminate. The laminating module 500 includes at least one pair of thermal rolls applying heat and pressure to the base sheet and the material sheet.

The pressureless thermal treatment module 600 comes into surface contact with the laminate transferred from the laminating module 500 to thermally treat the laminate without applying pressure. The pressureless thermal treatment module 600 includes at least one induction heating roll 610. Preferably, the pressureless thermal treatment module 600 includes multiple induction heating rolls 610 as illustrated in FIGS. 3A, 3B, 3C, 4A, 4B, 6A, and 6B.

The cooling module 700 cools the heat-threated laminate. The cooling module 700 includes at least one cooling roll. The cooling module 700 optionally includes a coolant supply unit that supplies coolant to the cooling roll when necessary.

The winding module 800 winds the cooled laminate into a roll. The winding module 800 includes a winding roll on which the laminate is to be wound and at least one guide roll for guiding the laminate.

The pouch film produced through the lamination and the thermal treatment undergoes an aging process in a rolled state or is directly transferred to a battery cell pouch manufacturing process.

Referring to FIG. 8, the pressureless thermal treatment module 600 may further include a heating controller 630.

The heating controller 630 controls the position of the movable induction heating roll 612 as illustrated in FIGS. 4A and 4B or controls the temperature of the induction heating rolls 610 as illustrated in FIGS. 6A and 6B.

For example, the heating controller 630 may control the on/off operation and the temperature of the induction heating rolls according to at least one of the feed speed of the laminate, the number and arrangement of the induction heating rolls 610 provided in the pressureless thermal treatment module 600, and the contact area with the laminate.

Specifically, as illustrated in FIGS. 6A and 6B, the heating controller 630 divides the multiple induction heating rolls 610 into at least two groups (a temperature elevation group and a temperature drop group) and controls the temperature of each of the induction heating rolls 610, group by group.

In addition, specifically, the heating controller may control the induction heating rolls such that at least some of the induction heating rolls disposed near an inlet side through which the laminate is introduced show sequential increases in temperature from the inducting heat roll disposed closest to the inlet side, and at least some induction heating rolls disposed near an outlet side through which the laminate is discharged show sequential decreases in temperature toward the induction heating roll disposed closest to the outlet side.

In addition, the multiple induction heating rolls 610 provided in the pressureless thermal treatment module 600 may be configured to serve as an accumulator.

More specifically, as illustrated in FIG. 9, the multiple induction heating rolls 610 are composed of one stationary induction heating roll 611 fixed at a position and at least one movable induction heating g roll 612 configured to perform reciprocating motion.

As illustrated at the bottom of FIG. 9, the heating controller 630 controls the position of the movable induction heating roll 612 to adjust at least one of the feed distance of the laminate and the number of the induction heating rolls 610 that come into surface contact with the laminate, thereby reducing the time for which the laminate stays for thermal treatment in the pressureless thermal treatment module 600.

FIG. 10 is a table showing comparison of physical properties between a laminate film produced by the method of FIG. 1 and a conventional laminate film.

Referring to FIG. 10 showing the measurements of the thermal bonding strength of an aluminum-CPP laminate in a non-aged state, a conventional laminate film according to a related art exhibits a thermal bonding strength of 0 N/15 mm, whereas the laminate film manufactured by the method of the present disclosure exhibits a thermal bonding strength of 70 N/15 mm. The conventional laminate film and the laminate film of the present disclosure show a big difference in the thermal bonding strength.

In addition, after one-day aging period has elapsed, the conventional laminate film exhibits a thermal bonding strength of 30 N/15 mm, whereas the laminate film manufactured by the method of the present disclosure exhibits a thermal bonding strength of 80 N/15 mm. That is, in each case, the thermal bonding strength is significantly increased through the aging.

In conclusion, when comparing a pouch product produced through the secondary laminating according to a conventional art and a pouch product manufactured by the method of the present disclosure in which induction heating rolls are used to perform stepwise thermal treatment, it is confirmed that the pouch product according to the present disclosure is improved in thermal bonding strength and physical strength after aging as compared to the conventional pouch product.

Herein above, regarding a method and apparatus for manufacturing a laminate film for a cell-type battery pouch, preferred embodiments have been described. The ordinarily skilled in the art will appreciate, from the detailed description, that the technical construction of the present disclosure can be implemented in other different forms without departing from the technical spirit or essential characteristics of the disclosure.

Therefore, it should be understood that the embodiments described above are only illustrative and are not restrictive in all aspects.

This invention was made with government support under Project ID 20013574 by the Ministry of Trade, Industry and Energy, Korea Evaluation Institute of Industrial Technology under research project "Development of Technology of Materials and Components-Materials and Components Packaging Type". The project was made by Youlchon Chemical Co., Ltd., a supervising institute, for the research period of Aug. 1, 2020 through Jul. 31, 2022.

What is claimed is:

1. A method of manufacturing a laminate film for a cell-type battery pouch, the method comprising:

hot pressing a material sheet on one surface of a base sheet to form a laminate; and thermally treating the laminate without applying pressure to the laminate, wherein the thermally treating comprises:

a temperature elevation stage of gradually increasing the amount of thermal energy supplied to the laminate until the temperature of the laminate reaches a thermal treatment target temperature; and a temperature drop stage of gradually decreasing the amount of thermal energy supplied to the laminate so that the temperature of the laminate gradually drops from the thermal treatment target temperature;

wherein in the thermally treating, the thermal energy is supplied to the laminate using multiple induction heating rolls, the temperature of the induction heating rolls used in the temperature elevation stage is gradually increased, and the temperature of the induction heating rolls used in the temperature drop stage is gradually decreased.

2. The method of claim 1, further comprising:

applying an adhesive to one surface of the base sheet to form an adhesive layer, the applying being performed prior to the hot pressing; and drying the adhesive layer to cure the adhesive layer, wherein the hot pressing is a process of stacking the material sheet on the cured adhesive layer and applying heat and pressure to the material sheet for lamination, wherein the method further comprises cooling the thermally treated laminate, the cooling being carried after the thermally treating.

3. The method of claim 1, wherein the thermally treating comprises supply a varying amount of thermal energy to the laminate depending on a feed speed of the laminate by using at least one induction heating roll.

4. The method of claim 3, wherein the thermally treating comprises varying the number of the induction heating rolls depending on the feed speed of the laminate.

5. The method of claim 3, wherein the thermally treating comprises adjusting the amount of thermal energy supplied to the laminate by controlling a contact area between the induction heating roll and the laminate.

6. The method of claim 1, wherein in the thermally treating, the position of the induction heating roll is controlled to adjust a contact area between the laminate and the induction heating roll, a feed path of the laminate, or both.

* * * * *